US010970039B2

(12) United States Patent
Kawamura

(10) Patent No.: US 10,970,039 B2
(45) Date of Patent: Apr. 6, 2021

(54) INFORMATION PROCESSING APPARATUS

(71) Applicant: FUJI XEROX CO., LTD., Tokyo (JP)

(72) Inventor: Satoshi Kawamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 154 days.

(21) Appl. No.: 15/943,733

(22) Filed: Apr. 3, 2018

(65) Prior Publication Data
US 2019/0034159 A1 Jan. 31, 2019

(30) Foreign Application Priority Data
Jul. 28, 2017 (JP) .............................. JP2017-146538

(51) Int. Cl.
G06F 3/16 (2006.01)
G06F 3/0484 (2013.01)
G06F 3/12 (2006.01)
G10L 13/10 (2013.01)

(52) U.S. Cl.
CPC .......... G06F 3/167 (2013.01); G06F 3/04842 (2013.01); G06F 3/04847 (2013.01); G06F 3/1293 (2013.01); G10L 13/10 (2013.01)

(58) Field of Classification Search
CPC ............... G06F 3/0482; G06F 3/04842; G06F 3/04847; G06F 3/1293; G06F 3/167; G10L 13/10
See application file for complete search history.

(56) References Cited

U.S. PATENT DOCUMENTS

| 2001/0014860 | A1* | 8/2001 | Kivimaki | G10L 13/04 704/260 |
| 2002/0178007 | A1* | 11/2002 | Slotznick | G09B 5/06 704/270.1 |
| 2003/0208356 | A1* | 11/2003 | King | G10L 13/00 704/270 |
| 2004/0098261 | A1* | 5/2004 | Kaneko | G10L 13/00 704/258 |
| 2005/0071165 | A1* | 3/2005 | Hofstader | G09B 21/006 704/270.1 |
| 2005/0111404 | A1* | 5/2005 | Tabeta | G10L 13/00 370/328 |
| 2006/0116884 | A1* | 6/2006 | Itaki | G10L 13/00 704/271 |
| 2007/0118383 | A1* | 5/2007 | Fukada | G10L 13/00 704/275 |
| 2009/0187950 | A1* | 7/2009 | Nicas | G10L 13/00 725/56 |

(Continued)

FOREIGN PATENT DOCUMENTS

JP 2013-089194 5/2013

Primary Examiner — Samuel G Neway
(74) Attorney, Agent, or Firm — JCIPRNET

(57) ABSTRACT

An information processing apparatus includes a detection unit and a controller. The detection unit detects a specific operation which is an operation to output audio related to a setting screen, and refers to an operation not to be performed for each setting item displayed on the setting screen. The controller performs control so as to output first audio information related to setting items satisfying a predetermined standard by audio, among setting items included in the setting contents, in a case where the specific operation is detected by the detection unit at a first stage before the setting contents are determined.

10 Claims, 8 Drawing Sheets

(56) References Cited

U.S. PATENT DOCUMENTS

| | | | |
|---|---|---|---|
| 2012/0046947 A1* | 2/2012 | Fleizach | G10L 13/00 704/260 |
| 2012/0116778 A1* | 5/2012 | Fleizach | G10L 13/0335 704/271 |
| 2014/0337033 A1* | 11/2014 | Kim | A61H 3/061 704/260 |
| 2015/0248887 A1* | 9/2015 | Wlodkowski | G10L 17/22 704/246 |
| 2019/0034159 A1* | 1/2019 | Kawamura | G06F 3/167 |

* cited by examiner

INFORMATION PROCESSING APPARATUS

CROSS-REFERENCE TO RELATED APPLICATIONS

This application is based on and claims priority under 35 USC 119 from Japanese Patent Application No. 2017-146538 filed Jul. 28, 2017.

BACKGROUND

Technical Field

The present invention relates to an information processing apparatus.

SUMMARY

According to an aspect of the invention, there is provided an information processing apparatus including a detection unit that detects a specific operation which is an operation to output audio related to a setting screen, and refers to an operation not to be performed for each setting item displayed on the setting screen; and a controller that performs control so as to output first audio information related to a setting item satisfying a predetermined standard by audio, among setting items included in the setting contents, in a case where the specific operation is detected by the detection unit at a first stage before the setting contents are determined.

BRIEF DESCRIPTION OF THE DRAWINGS

Exemplary embodiment(s) of the present invention will be described in detail based on the following figures, wherein.

DETAILED DESCRIPTION

Figure 1:
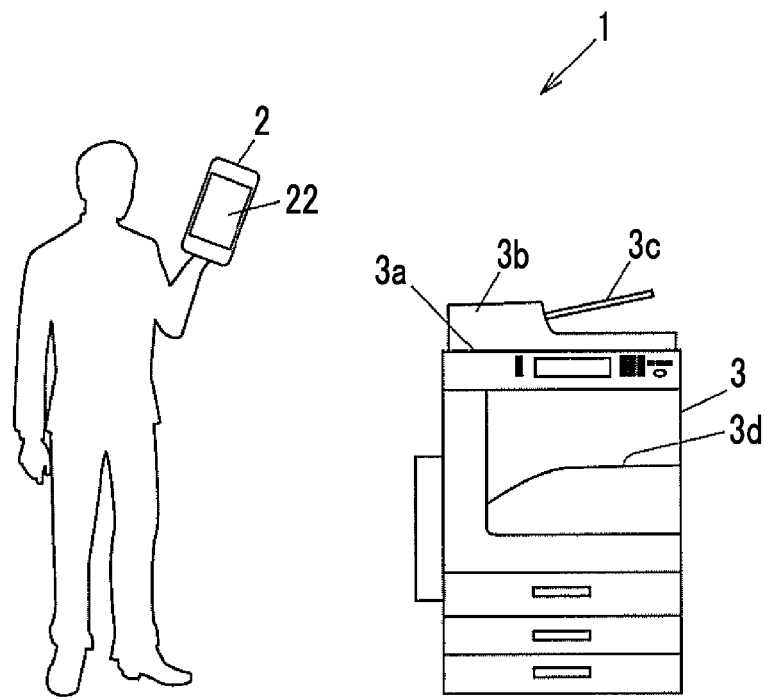
FIG. 1 is a diagram illustrating a configuration example of an image forming system according to an exemplary embodiment of the present invention.

Hereinafter, exemplary embodiments of the present invention will be described with reference to the drawings. In the drawings, the same reference numerals are attached to the constituent elements having substantially the same function, and duplicated explanations are omitted.

Summary of Exemplary Embodiment

According to the present exemplary embodiment, there is an information processing apparatus includes a detection unit that detects a specific operation which is an operation to output audio related to a setting screen, and refers to an operation not to be performed for each setting item displayed on the setting screen; and a controller that performs control so as to output first audio information related to setting items satisfying a predetermined standard by audio, among setting items included in the setting contents, in a case where the specific operation is detected by the detection unit at a first stage before the setting contents are determined.

"Specific operation" is an operation to output audio related to the setting screen and refers to an operation not to be performed for each setting item displayed on the setting screen. The specific operation includes, for example, an operation (shake) of shaking the device a little plural times (three times or more, for example), an operation of shaking the device largely plural times (for example, three or more times), a rotation operation, and the like, and a natural hand shaking operation when walking and a tap operation are excluded. "Setting contents" means information for executing a function of an external device or the terminal device, and includes setting items and setting values for the setting items. The setting items and setting values are also referred to as parameters.

"Setting items satisfying a predetermined standard" include, for example, the following items. (a) All setting items, (b) setting items of which setting values have been changed last time, (c) setting items whose setting values have been changed most recently, (d) setting items changed from default, and (e) setting items for which an unfamiliar operation is made (for example, a setting item to be changed to a setting value that is not capable of being set because it conflicts with other setting items, a setting value that is changed in the lost and then returned to the original state and a corresponding setting item, and the like).

Setting items satisfying a predetermined standard are not limited to those described above. For example, in a case where there are many setting items such that the setting items are not capable of being displayed on a single screen, the setting items may be setting items to be initially displayed excluding setting items to be displayed by scrolling.

The controller may output the second audio information related to the setting contents by audio in a case where a specific operation is detected by the detection unit at the second stage after the setting contents are determined. One of the first audio information and the second audio information may include all of the setting contents, the other may include a part. Alternatively, both may include a part, or both may have the same contents or different contents.

Exemplary Embodiment

FIG. 1 is a diagram illustrating a configuration example of an image forming system according to an exemplary embodiment of the present invention. The image forming system 1 includes a terminal device 2 operated by a user and an image forming device 3 for executing an image process instructed by the user. The terminal device 2 is an example of an information processing apparatus and may be referred to as a mobile terminal in some cases.

As the terminal device 2, for example, a portable information processing apparatus such as a personal computer (PC), a multifunctional mobile phone (smartphone), or the like may be used. The terminal device 2 and the image forming device 3 are configured such that wireless communication may be established therebetween.

The image forming device 3 is, for example, a multifunction peripheral having plural functions such as scan (e-mail transmission), scan (box save), print, fax, and copy as examples of image processing.

Scan (e-mail transmission) is a function of reading the image of the document with the scanner 33 and transmitting the image to the designated e-mail address. Scan (box) is a function of reading the image of the document with the scanner 33 and storing the image in a box provided in a storage unit 31 of the image forming device 3. The fax is a function of reading the image of a document with the scanner 33 and faxing the image by the facsimile 35. The copy is a function of executing a print job (including print data and printing conditions) transmitted from the terminal device 2 or another PC. "Copy" is to read the image of the document with the scanner 33 and print the image on the sheet by the printer 34.

A document table 3a on which a document is placed and an automatic document feeder 3c for feeding the document placed on the paper feed tray 3b to the document table 3a are provided on the upper portion of the image forming device 3. A discharge table 3d for discharging a sheet on which an image is printed is provided in a central portion of the image forming device 3.

Figure 2:
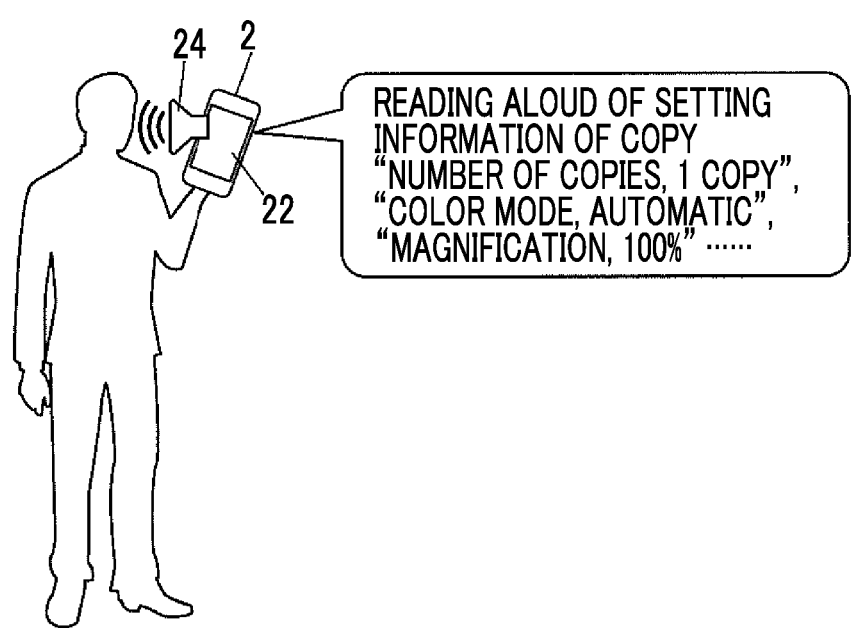
FIG. 2 is a diagram for explaining a function of a terminal device.

FIG. 2 is a diagram for explaining the functions of the terminal device 2. The terminal device 2 has a function of detecting a specific operation such as shaking of the terminal device 2 by the user and a function of reading aloud the setting contents of the selected function by outputting audio. Further, the terminal device 2 has a function of transmitting a function execution instruction and setting contents to the image forming device 3 in a case where the user performs an operation of holding the terminal device 2 over the image forming device 3.

Figure 3:
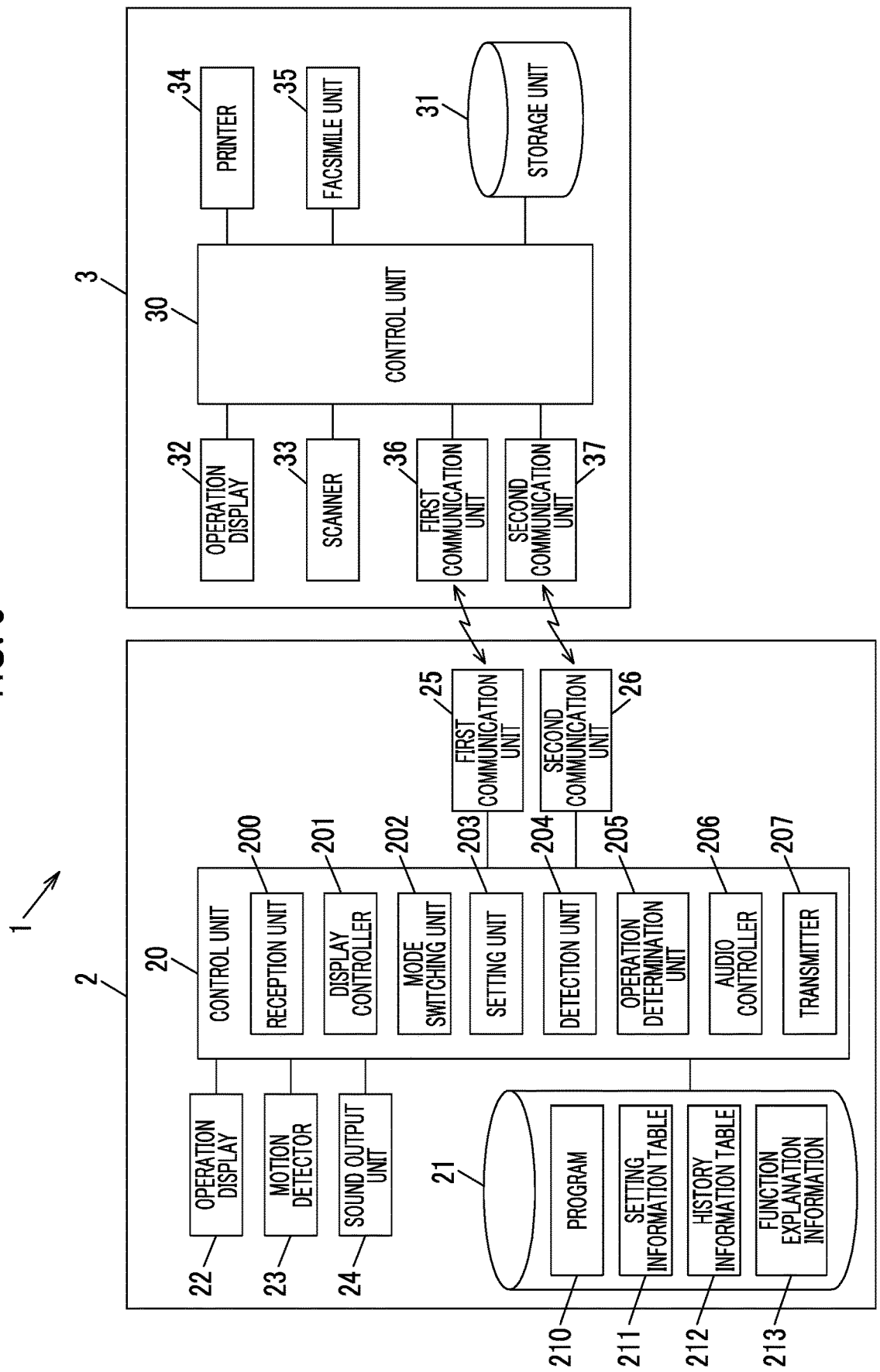
FIG. 3 is a block diagram illustrating an example of a control system of the image forming system.

FIG. 3 is a block diagram illustrating an example of a control system of the image forming system 1.

Configuration of Terminal Device

The terminal device 2 includes a control unit 20 that controls each unit of the terminal device 2, a storage unit 21 that stores various types of information, an operation display 22, a motion detector 23, an audio output unit 24, a first communication unit 25, and a second communication unit 26.

The control unit 20 is configured with a central processing unit (CPU), an interface, and the like. The CPU operates according to the program 210, and functions as the reception unit 200, the display controller 201, the mode switching unit 202, the setting unit 203, the detection unit 204, the operation determination unit 205, the audio controller 206, the transmitter 207, and the like. Details of each of units 200 to 207 will be described later. The display controller 201 and the audio controller 206 are examples of the controller.

The storage unit 21 is configured with a read only memory (ROM), a random access memory (RAM), a hard disk, and the like, and stores a program 210, a setting information table 211, a history information table 212, function explanation information 213, and the like. In the present specification, in a case where information is written into a table, recording is used, and in a case where information is written into a storage unit, storage is used.

In the setting information table 211, setting contents set for each function are recorded as setting information.

As examples of setting items and setting values, in the case of "copy", there are, for example, the number of copies and 1 copy, color mode and automatic, magnification and 100%, or the like. In the case of "scan (e-mail transmission)", for example, there are reading conditions for scan, an e-mail address of a destination, and the like. In the case of "scan (box save)", for example, there are reading conditions for scan, user names for specifying boxes, and the like. In the case of "fax", there are reading conditions for scan, a fax number of a destination, and the like. In the case of "favorite list", the setting contents the user likes for copy are registered as setting information.

In the history information table 212, in a case where the default setting value is changed or the changed setting value is further changed, the changed setting value and the corresponding setting item are recorded for each function as history information. Further, in the history information table 212, a setting value and a corresponding setting item in a case where the user attempts to change the setting item to a setting value that is not capable of being set because it conflicts with other setting items or a case where a setting value is changed in the lost and then returned to the original state are recorded as history information.

In the function explanation information 213, a function explanatory text for explaining the outline of the function is recorded for each function.

The operation display 22 has a touch panel display on which a touch panel is overlapped and disposed on a display such as a liquid crystal display, displays a display screen on the display, and receives an operation on the touch panel from the operator. In addition, the operation display 22 may be configured with an input unit and a display provided independently.

The motion detector 23 includes an acceleration sensor that detects accelerations in three axial directions. The acceleration sensor detects accelerations in three axial directions applied to the terminal device 2, and transmits the value of the detected acceleration to the control unit 20. A specific operation may be detected in a case where any one of accelerations in three axial directions exceeds a threshold value. The motion detector 23 may further include an angular velocity sensor. The angular velocity sensor is, for example, a gyro sensor, measures angular velocities in the yaw direction, the rolling direction, and the pitching direction applied to the terminal device 2, and transmits the measured value of the angular velocity to the control unit 20. It is possible to detect the attitude of the terminal device 2 from the acceleration and the angular velocity, and it is possible to detect a detailed movement of the terminal device 2 only from the acceleration.

The audio output unit 24 includes a D/A converter that converts the digital audio information into an analog audio signal, and a speaker that outputs the audio signal converted by the D/A converter as audio.

The first communication unit 25 performs short-distance wireless communication, for example, near field communication (NFC) communication with the first communication unit 36 of the image forming device 3. The first communication unit 25 includes a memory into which communication data to be communicated by NFC communication is written. Here, the communication data is a function execution instruction and setting information.

The second communication unit 26 performs, for example, Wi-Fi communication with the second communication unit 37 of the image forming device 3.

Configuration of Each Unit of Terminal Device

Next, each unit 200 of the control unit 20 of the terminal device 2 will be described.

The reception unit 200 receives an operation on the operation display 22 and an operation on the screen displayed by the operation display 22.

The display controller 201 performs control so as to display various screens such as an initial screen 100 (see FIG. 4), a setting screen 110 (see FIG. 5), a standby screen (see FIG. 6), and a sensitivity setting screen on the display screen of the operation display 22, based on the operation on the operation display 22 by the user. The setting screen 110 is an example of the first screen. The standby screen 120 is an example of the second screen. The initial screen 100 is an example of the selection screen.

The mode switching unit 202 switches from the normal mode to the specific mode in a case where double tapping on the initial screen 100 (see FIG. 4) is performed. The normal mode is a mode in which output by audio is not performed even in a case where a specific operation is performed on the terminal device 2. The specific mode is a mode in which output by audio is performed in a case where a specific operation is performed on the terminal device 2. The specific mode continues even in a case of switching from the initial screen 100 to the setting screen 110, and continues even in a case of switching to the standby screen 120. In a case where the initial screen 100 is displayed, the process returns to the normal mode. Switching from the normal mode to the specific mode may be performed by setting by the button operation or the like.

In a case where the setting contents are changed, the setting unit 203 rewrites the setting information table 211 stored in the storage unit 21, and also records in the history information table 212, a fact that the setting contents have been changed, that is, the change date and time, and the changed setting value and setting item.

The detection unit 204 detects a specific operation such as shaking with respect to the terminal device 2, based on the acceleration output from the motion detector 23 and the threshold value. In a case where a specific operation is detected, the detection unit 204 notifies the audio controller 206 that a specific operation has been detected. The sensitivity for detecting a specific operation may be changed on the sensitivity setting screen.

The operation determination unit 205 determines whether or not the setting value has been changed last time and whether or not an unfamiliar operation has been performed, based on the setting information table 211 representing the current setting contents and the history information table 212 representing the history of the setting contents in the past. Whether or not the setting value has been changed last time is an example of a predetermined standard. "Last time" means the time before activating the program 210.

The setting value changed last time may be a setting value changed from the default, or may be a setting value that has been changed immediately before.

Whether or not an "unfamiliar operation" is made includes a case where the user attempts to change a setting item to a setting value that is not capable of being set because it conflicts with other setting items or a case where a setting value is changed in the lost and then returned to the original state. For example, the number of times of a case where an erroneous setting value is selected is recorded in the history information table 212, and in a case where the number of times is equal to or larger than the threshold value, audio may be output for the setting item. For example, a case is conceivable where the position to stop the stapler and the position of hole punching are set to the same position. For example, the number of times of returning without doing anything is recorded in the history information table 212, and in a case where the number of times is equal to or larger than the threshold value, it is determined that the operation is unfamiliar for the setting item, and audio may be output for the setting item. For example, the color mode is selected as the setting item, but a case is considered where the setting value is returned without being changed from the color to black and white. A case where the number of times is equal to or larger than the threshold value is an example of a predetermined standard.

In the specific mode, in a case where the specific operation is detected by the detection unit 204 while the setting screen 110 (see FIG. 5) is being displayed on the operation display 22, the audio controller 206 performs a first reading aloud process; in a case where the specific operation is detected by the detection unit 204 while the standby screen 120 (see FIG. 6) is being displayed on the operation display 22, the audio controller 206 performs a second reading aloud process; and in a case where the specific operation is detected by the detection unit 204 while the initial screen 100 (see FIG. 4) is being displayed on the operation display 22, the audio controller 206 performs a third reading aloud process. Even in a case where small letters are difficult to read due to the user's vision or the like by the reading aloud process, it is possible to recognize the setting contents, the display contents, and the like.

In the first reading aloud process, control is made so as to output the first audio information related to the setting contents by audio. In the second reading aloud process, control is made so as to output the second audio information related to the setting contents by audio. One of the first audio information and the second audio information may include a setting item and a setting value related to a setting value changed last time, or a setting item and a setting value related to an unfamiliar operation, which are determined by the operation determination unit 205, and the other of the first audio information and the second audio information may include a remaining setting items and setting values, or all the setting contents. The setting items and setting values related to the unfamiliar operation may be excluded from targets to be output by audio, in a case of outputting the setting items and setting values by audio a predetermined number of times.

In the first and second reading aloud processes, the audio controller 206 reads out setting contents from the setting information table 211 and the history information table 212, inputs the setting contents as audio information to the audio output unit 24, outputs audio from the audio output unit 24.

In the first reading aloud process and the second reading aloud process, setting contents to be read aloud may be the same or different. All of the setting contents may be read aloud in one of the first and second reading aloud processes, or a part of the setting contents may be read aloud in the other. A part of the setting contents may be read aloud in one of the first and second reading aloud processes, or the remaining setting contents may be read aloud in the other. Further, in a case where there are a large number of changes of the previous setting values for all the setting items, the setting values and the setting items which have not been changed may be read aloud.

Further, in the first or second reading aloud process, the setting items and the setting values, which have been read aloud a predetermined number of times, may be excluded from targets to be read aloud. In addition, in a case where the terminal device 2 is shaken while reading aloud is in progress, the setting items and the setting values may be read aloud from the beginning. In a case where the setting value has not been changed, the setting value may not be read aloud.

In the third reading aloud process, after a function is selected on the initial screen 100, in a case where a specific operation for the terminal device 2 is detected, the audio controller 206 reads out a function explanatory text corresponding to the selected function from the function explanation information 213, inputs it to the audio output unit 24 as audio information, and outputs the function explanatory text by audio from the audio output unit 24. In addition, after the reading aloud process is performed a predetermined number of times, the explanation of the function may be changed to simple one, and the reading aloud process may not be performed. For example, on the initial screen 100, the number of selections of copy is recorded in the history information table 212, and in a case where the number of times is equal to or larger than the threshold value, an explanation as to what may be done in copy may be changed to reading aloud of a simple explanation in such a manner that "There is a color mode" from "You may set color, black and white, and gray scale, in a color mode".

In a case where the setting contents are changed while reading aloud is in progress, the audio controller 206 performs control so as to interrupt the reading aloud, and in a case where the detection unit 204 detects a specific operation again, it performs control so as to resume the reading aloud from the place where the reading aloud is interrupted.

In a case where the setting contents displayed on the setting screen are determined, the transmitter 207 reads out the corresponding setting information from the setting information table 211 and writes it into the memory of the first communication unit 25.

Configuration of Image Forming Device

The image forming device 3 includes a control unit 30 that controls each unit of the image forming device 3, the storage unit 31 that stores various types of information, an operation display 32 that receives an operation from a user and displays information, a scanner 33 that reads an image from a document, a printer 34 that prints an image on a recording medium such as paper, a facsimile 35 that performs facsimile transmission and reception of an image through a public line, a first communication unit 36, and a second communication unit 37.

The control unit 30 is configured with a central processing unit (CPU), an interface, and the like.

The storage unit 31 is configured with a read only memory (ROM), a random access memory (RAM), a hard disk, and the like, and stores programs and various data.

The first communication unit 36 performs short-distance wireless communication, for example, NFC communication with the first communication unit 25 of the terminal device 2. The first communication unit 36 is configured with, for example, an NFC reader. The first communication unit 36 reads the information written in the memory of the first communication unit 25 of the terminal device 2.

The second communication unit 37 performs, for example, Wi-Fi communication with the second communication unit 26 of the terminal device 2. In a case of executing scan (e-mail transmission), the image read from the document by the scanner 33 is transmitted to the terminal device 2 or the PC by the second communication unit 37 by an e-mail.

Description of Various Screens

Next, the initial screen, the setting screen, and the standby screen displayed on the operation display 22 by the display controller 201 will be described with reference to FIGS. 4 to 6.

Figure 4:
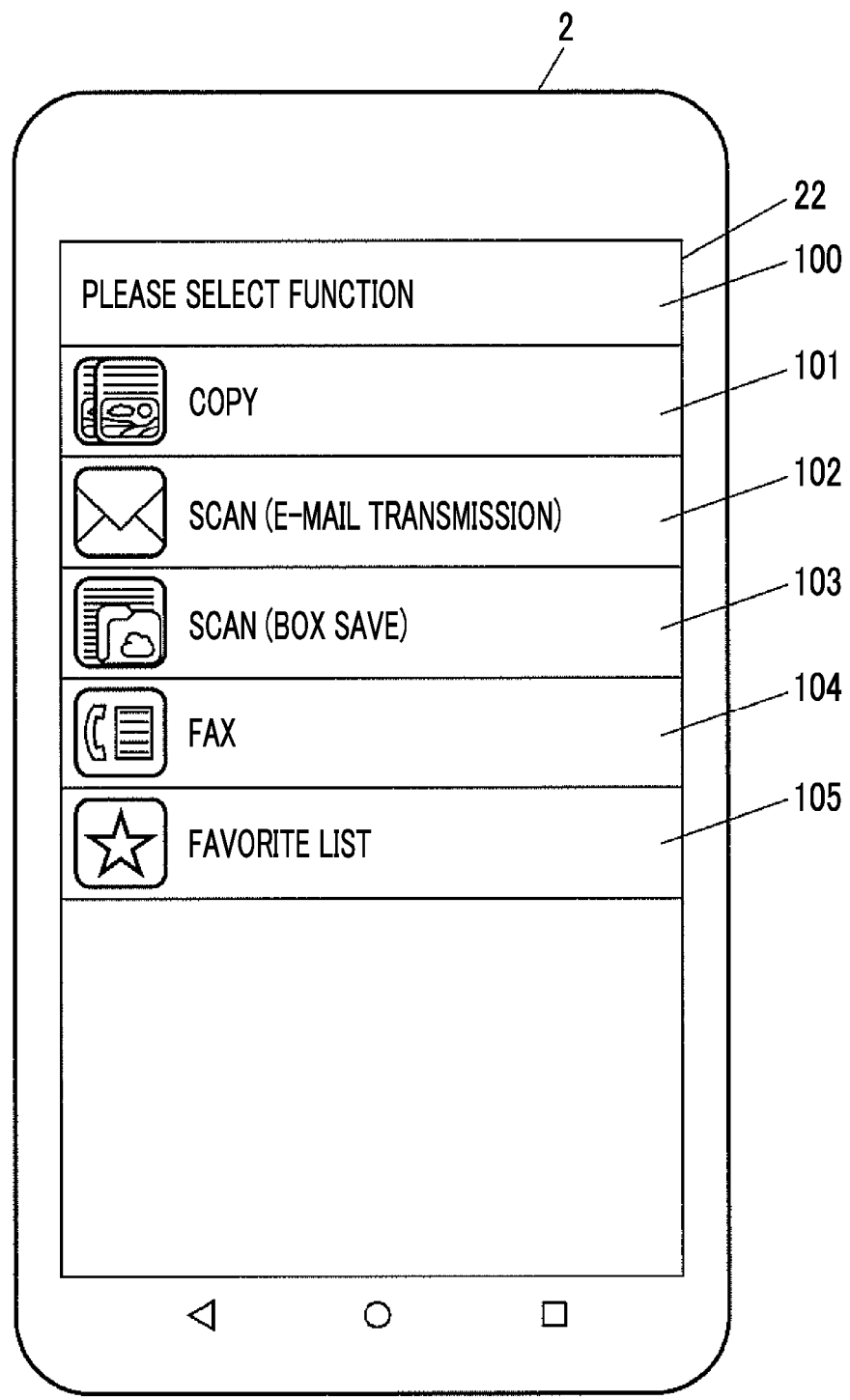
FIG. 4 is a diagram illustrating an example of an initial screen.

FIG. 4 is a diagram illustrating an example of an initial screen displayed on the operation display 22. On the initial screen 100, as shown in FIG. 3, the respective functions 101 to 105 of "copy", "scan (e-mail transmission)", "scan (box save)", "fax", and "favorite list" are displayed. "Copy", "scan (e-mail transmission)", "scan (box save)", and "fax" are functions of the image forming device 3, and "favorite list" is the function of the terminal device 2.

"Copy" is to read the image of the document with the scanner 33 and print the image on the sheet by the printer 34. "Favorite list" is a function of storing the parameters of "copy" as favorites and displaying a list of parameters.

Figure 5:
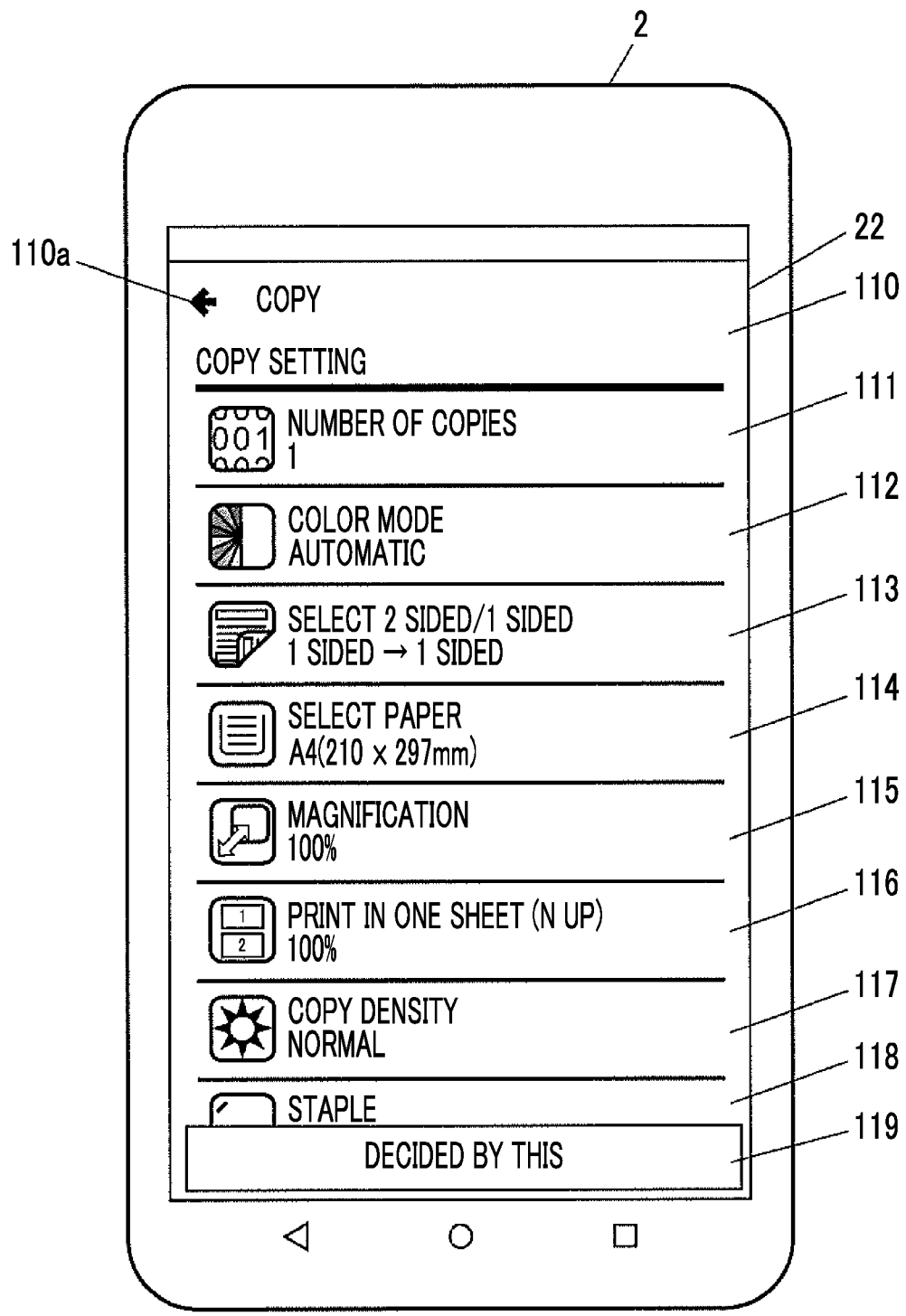
FIG. 5 is a diagram illustrating an example of a "copy" setting screen.

FIG. 5 is a diagram illustrating an example of a "copy" setting screen displayed on the operation display 22. On the "copy" setting screen 110, the parameters 111 to 118 set for copy are displayed as a list and the decision button 119 displayed as "decided by this" is displayed. A setting item and a setting value are displayed in each of the parameters 111 to 118. In FIG. 5, 110a is a back button for returning to the previous screen (the initial screen 100). In a case of changing the setting contents, in a case where any of the parameters 111 to 118 is touched and selected, a setting value change screen appears, and the setting value is changed on the setting value change screen. The setting unit 203 rewrites the setting information table 211 with the changed setting contents, and records the changed contents in the history information table 212. In a case where the setting screen 110 is displayed again, the setting contents changed last time are reflected. In a case where the decision button 119 is operated, the setting contents displayed on the setting screen 110 are determined. Eight parameters 111 to 118 are displayed on the setting screen 110, but other parameters are displayed by scrolling.

In addition, in a case where the decision button 119 is operated, the setting contents may be read aloud by outputting an audio. It is possible to check the setting value changed this time by audio. Further, in a case where setting to return to the default value is made without reflecting the contents changed last time, the color mode is always changed from the default color to black and white. However, in a case where the setting value, which is always changed, is not changed this time as in the case where the setting value has not been changed, audio may be output.

Figure 6:
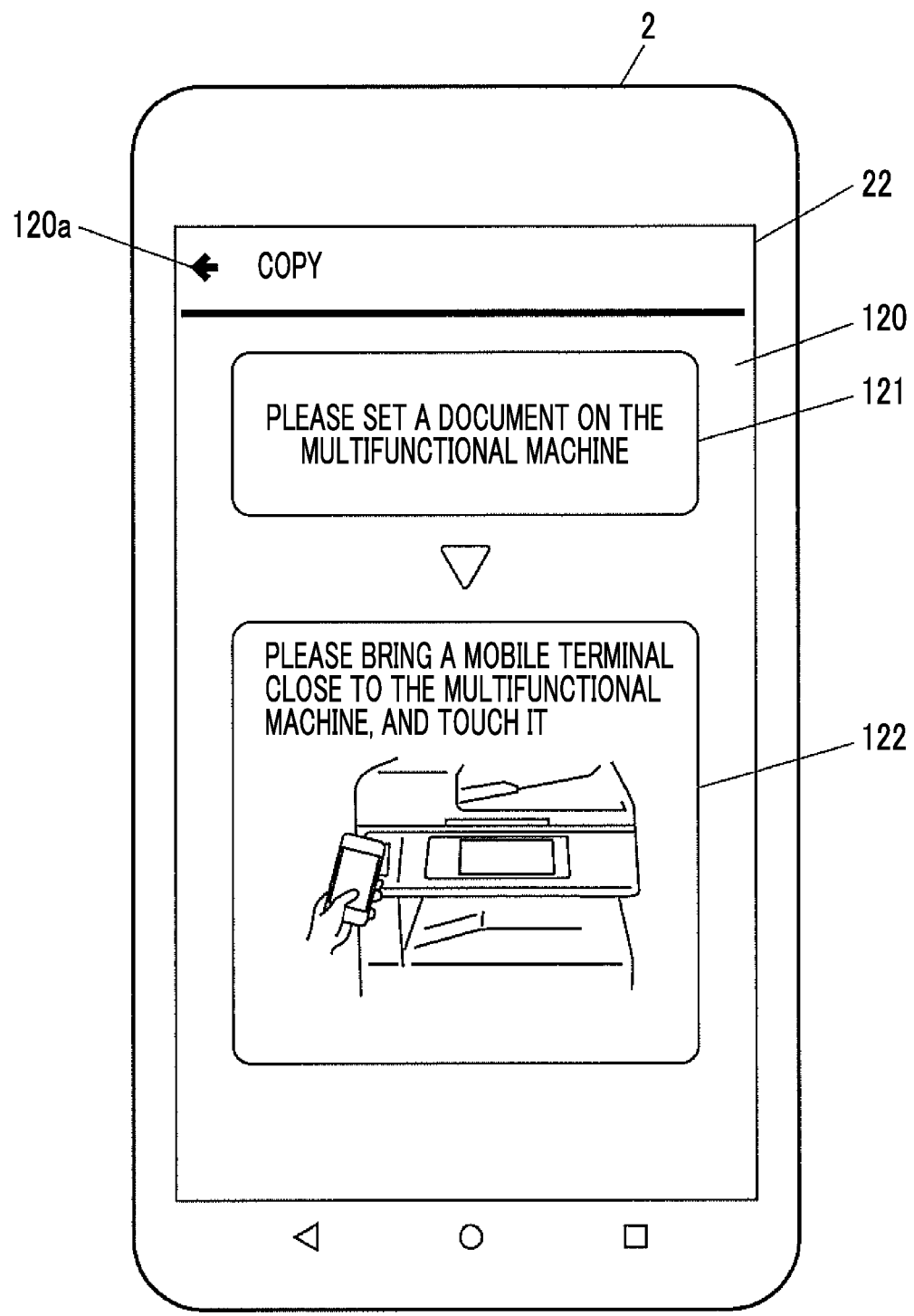
FIG. 6 is a diagram illustrating an example of a standby screen.

FIG. 6 is a diagram illustrating an example of a standby screen displayed on the operation display 22. On the standby screen 120, the first guidance information 121 of "Please set a document on the multifunctional machine" and the second guidance information 122 of "Please bring a mobile terminal close to the multifunctional machine, and touch it" are displayed. In a case where the part of the first guidance information 121 is touched on the standby screen 120, the first guidance information 121 is output as audio; and in a case where the part of the second guidance information 122 is touched, the second guidance information 122 Is output as audio. In FIG. 6, 120a is a back button for returning to the previous screen (setting screen 110).

Operation of Exemplary Embodiment

Figure 8:
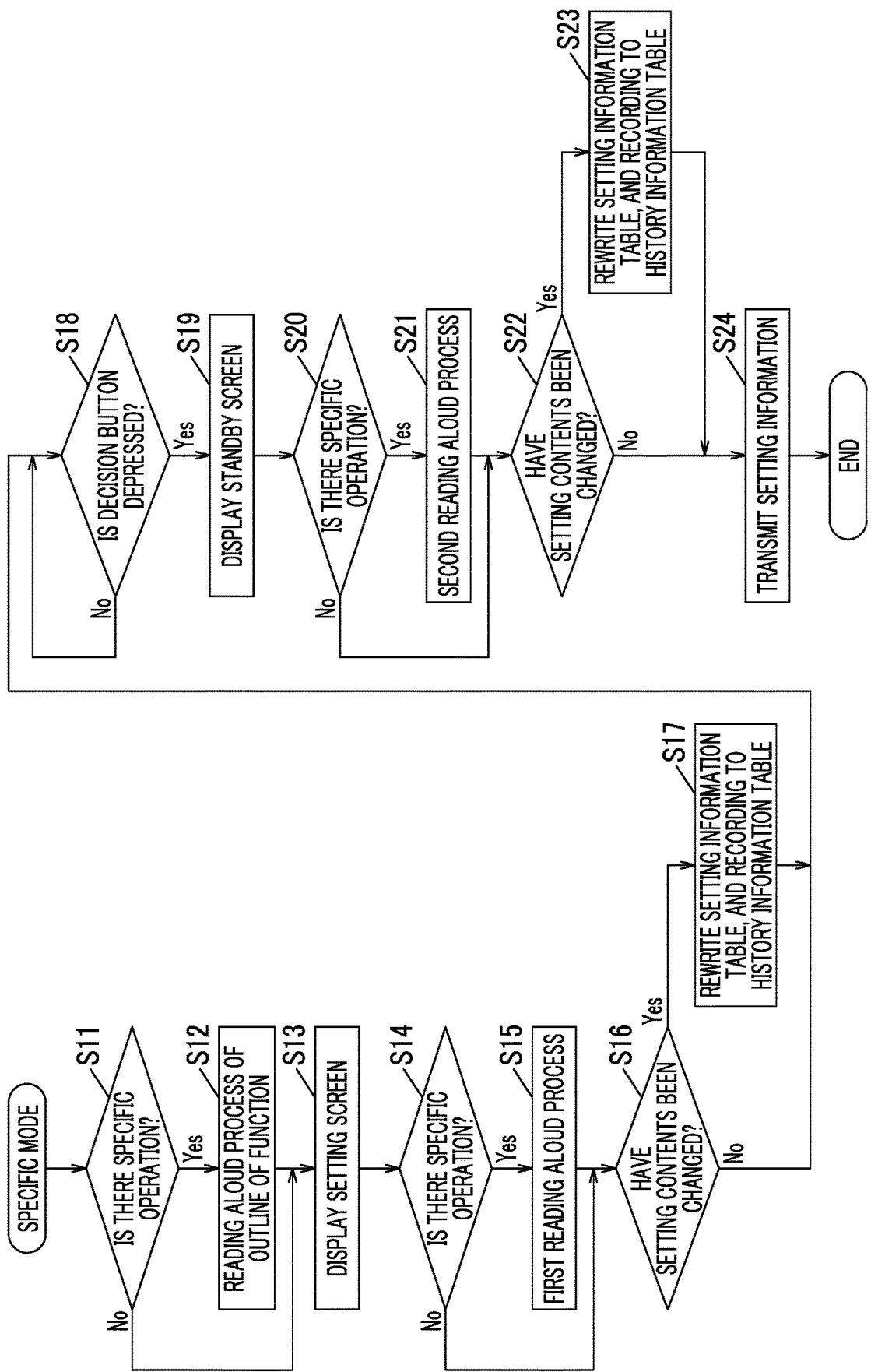
FIG. 8 is a flowchart illustrating an example of an operation in a specific mode of the terminal device.
Figure 9:
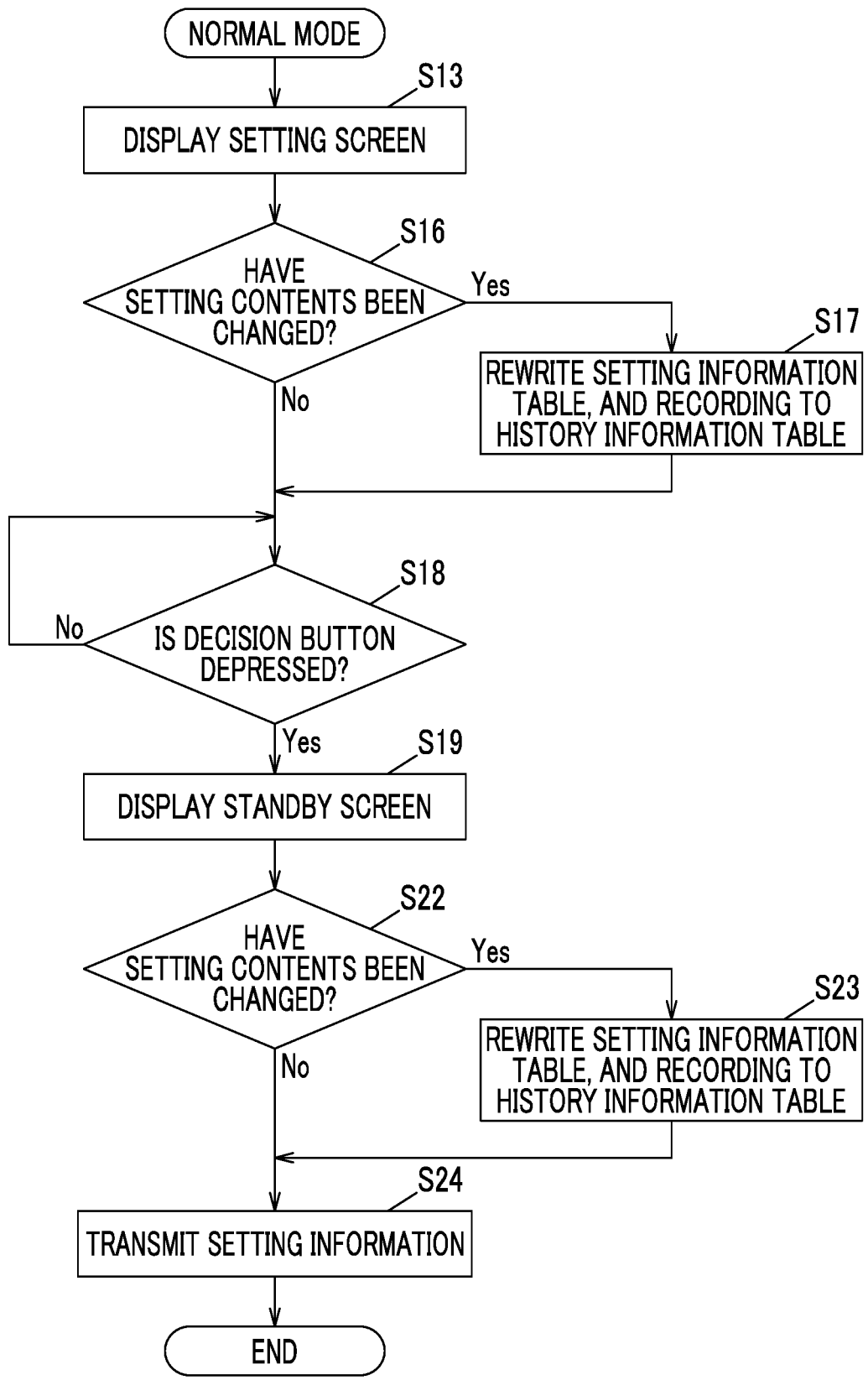
FIG. 9 is a flowchart illustrating an example of an operation in a normal mode of the terminal device.

Next, an example of the operation of the image forming system 1 will be described with reference to the flowcharts of FIGS. 7, 8, and 9.

(1) Mode Switching

Figure 7:
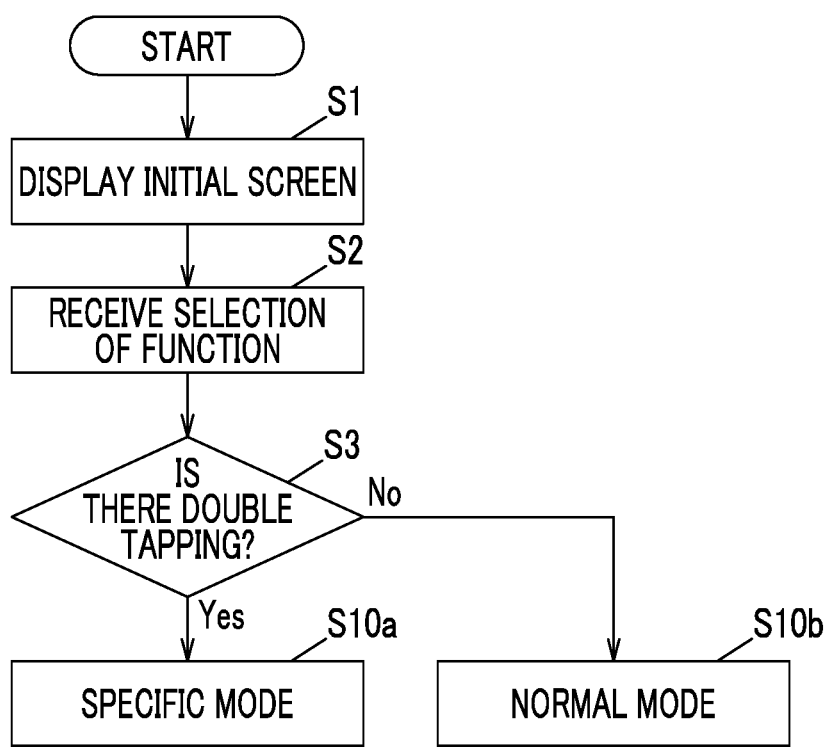
FIG. 7 is a flowchart illustrating an example of an operation until mode switching from an initial screen display on the terminal device.

FIG. 7 is a flowchart illustrating an example of an operation until mode switching from an initial screen display on the terminal device 2.

In a case where the user operates the operation display 22 of the terminal device 2 to request the display of the initial screen, the reception unit 200 receives the request, and the display controller 201 performs control so as to display the initial screen 100 (see FIG. 4) on the operation display 22 (S1).

In a case where the user touches one of the functions 101 to 105 on the initial screen 100 to selects a function, the reception unit 200 receives the selection of the function (S2). Here, it is assumed that the user selects the "copy" function 101.

The mode switching unit 202 determines whether or not double tapping is performed on the initial screen 100 (S3). In the case of double tapping (S3: Yes), the mode switching unit 202 switches from the normal mode to the specific mode (S10a). The user double-taps any part of the initial screen 100 to switch from the normal mode to the specific mode. In a case where double tapping is not performed (S3: No), the mode switching unit 202 keeps the normal mode (S10b).

In addition, it is configured such that the mode may be switched after selecting the function, but it may be configured such that the mode may be switched before the function is selected and in a case where the terminal device 2 is shaken, the display contents on the initial screen 100 may be read aloud.

(2) Specific Mode

Next, the specific mode will be described. FIG. 8 is a flowchart illustrating an example of an operation in a specific mode of the terminal device 2.

In a case where the user performs a specific operation such as shaking the terminal device 2 within a predetermined time after shifting to the specific mode, the motion detector 23 detects a specific operation on the terminal device 2 (S11: Yes), and notifies the audio controller 206 that the specific operation has been detected.

The audio controller 206 reads out the function explanatory text corresponding to the function selected in step S2 from the function explanation information 213, inputs it to the audio output unit 24 as audio information, and outputs the function explanatory text by audio from the audio output unit 24 (S12).

Next, in step S2 shown in FIG. 7, the display controller 201 performs controls so as to display the setting screen 110 (see FIG. 4) corresponding to the selected function on the operation display 32 (S13).

In a case where the user performs a specific operation such as shaking the terminal device 2, the detection unit 204 detects a specific operation on the terminal device 2 (S14: Yes), and notifies the audio controller 206 that the specific operation has been detected.

As shown in FIG. 2, the audio controller 206 reads out the setting information corresponding to the storage unit 21 from the setting information table 211, inputs the setting information to the audio output unit 24 as audio data, and outputs audio from the audio output unit 24 to perform the first reading aloud process (S15). In the first reading aloud process, all the setting contents are read aloud.

Next, the setting unit 203 determines whether or not the setting contents have been changed (S16). In a case where the setting contents have been changed (S16: Yes), the setting information table 211 is rewritten with the changed setting information, and the changed contents are recorded in the history information table 212 (S17). In a case of changing the setting contents, the user touches the setting item that the user wants to change, among the plural setting items displayed on the setting screen 110, and changes the setting value.

In a case where the user touches the decision button 119 of "decided by this" displayed on the setting screen 110, the reception unit 200 receives it (S18). By the operation of the decision button 119, the setting contents are determined. The transmitter 207 reads out the determined setting information from the setting information table 211 and writes it into the memory of the first communication unit 25. The time before the decision button 119 is operated is an example of the first stage before the setting contents are determined. The time after the decision button 119 is operated is an example of the second stage after the setting contents are determined.

The display controller 201 performs control so as to display the standby screen 120 (see FIG. 6) on the operation display 22 (S19).

In a case where the user performs a specific operation such as shaking the terminal device 2, the detection unit 204 detects a specific operation as described above (S20: Yes). The detection unit 204 notifies the audio controller 206 that the specific operation has been performed on the terminal device 2.

The audio controller 206 performs the second reading aloud process of reading aloud the setting contents by the audio output unit 24 (S21).

In the second reading aloud process, the operation determination unit 205 determines whether or not the setting value that has been changed last time is included and determines whether or not a setting item that has been operated by an unfamiliar operation is included, based on the selection of the setting item received by the reception unit 200, the change of the setting value, and the history information table 212.

In the second reading aloud process, in a case where the operation determination unit 205 determines that the current setting contents include the setting value that has been changed last time or the setting item for which an unfamiliar operation is performed, parts other than the setting value and setting item changed this time or the unfamiliar setting item and setting value among the parts changed last time are not read aloud. For example, in a case where the setting values for three setting items of the color mode, the magnification, and the copy density have been changed last time, the three changed setting items and setting values are read aloud. Further, in a case where only the setting value for one setting item of magnification has been changed last time, only one changed setting item and setting value are read aloud.

In addition, in the first reading aloud process, only the setting items of which setting values have been changed last time and the setting values may be read aloud; and in the second reading aloud process, all of the setting contents may be read aloud. Further, in the second reading aloud process, for example, the setting contents that have not been read aloud in the first reading aloud process, that is, the setting items and setting values that have not been changed last time may be read aloud.

Further, in the second reading aloud process, the first guidance information 121 and the second guidance information 122, displayed on the standby screen 120, may be read aloud. Further, in the second reading aloud process, in a case where the setting contents are changed in step S16, the changed setting items and setting values may be read aloud. For example, in a case where only the setting value for one setting item of the magnification is changed this time, the items related to the color mode and the copy density, which have been changed last time, are not read aloud, and only the setting item and setting value relating to the most recently changed magnification are read aloud.

Next, the setting unit 203 determines whether or not the setting contents have been changed (S22). In a case where the setting contents have been changed (S22: Yes), the setting unit 203 rewrites the setting information table 211 with the changed setting contents, and records the changed contents in the history information table 212 (S23). To change the setting contents, the setting screen 110 shown in FIG. 5 is displayed on the operation display 22 by touching the back button 120a on the standby screen 120. The transmitter 207 rewrites the memory of the first communication unit 25 with the changed setting contents.

The user places the document on the paper feed tray 3b of the automatic document feeder 3c according to the first guidance information 121, and the user places the first communication unit 25 of the terminal device 2 close to the first communication unit 36 of the image forming device 3 according to the second guidance information 122.

In a case where communication is established between the first communication unit 25 of the terminal device 2 and the first communication unit 36 of the image forming device 3, the setting information stored in the memory of the first communication unit 25 is read into the first communication unit 36 (S24). Thereafter, the image of the document is read by the scanner 33, the image is printed on the sheet by the printer 34, and is discharged to the discharge table 3d.

(3) Normal Mode

Next, the normal mode will be described. FIG. 9 is a flowchart illustrating an example of an operation in a normal mode of the terminal device 2. Since the normal mode is the same as the specific mode except that it does not have steps of the determination (S11, S14, and S20) as to whether or not there is a specific operation, the read aloud process (S12) of the outline of a function, the first reading aloud process (S15), and the second reading aloud process (S21), the outline of the normal mode will be explained.

First, similarly to the specific mode, a setting screen 110 (see FIG. 5) corresponding to the function selected in step S2 shown in FIG. 7 is displayed on the operation display 32 (S13).

Next, it is determined whether or not the setting contents have been changed (S16). In a case where the setting contents have been changed (S16: Yes), the setting unit 203 rewrites the setting information table 211 with the changed setting contents, and records the changed contents in the history information table 212 (S17).

In a case where the user touches the decision button 119 of "decided by this" displayed on the setting screen 110, the reception unit 200 receives it (S18). In a case where the setting contents displayed on the setting screen 110 are determined, the transmitter 207 reads out the corresponding setting information from the setting information table 211 and writes it into the memory of the first communication unit 25.

Next, the standby screen 120 (see FIG. 6) is displayed on the operation display 22 (S19).

Next, it is determined whether or not the setting contents have been changed (S22). In a case where the setting contents have been changed (S22: Yes), the setting unit 203 rewrites the setting information table 211 with the changed setting contents, and records the changed contents in the history information table 212 (S23). The transmitter 207 rewrites the memory of the first communication unit 25 with the changed setting contents.

The user places the document on the paper feed tray 3b of the automatic document feeder 3c according to the first guidance information 121 displayed on the standby screen 120, and the user holds the first communication unit 25 of the terminal device 2 over the first communication unit 36 of the image forming device 3 according to the second guidance information 122 displayed on the standby screen 120.

In a case where communication is established between the first communication unit 25 of the terminal device 2 and the first communication unit 36 of the image forming device 3, the setting information stored in the memory of the first communication unit 25 is read into the first communication unit 36 (S24).

Although the exemplary embodiments of the invention have been described above, the exemplary embodiments of the invention are not limited to the above exemplary embodiments, and various modifications and implementations are possible within the scope not changing the gist of the present invention.

For example, in a case where all the setting contents are to be read aloud, the setting values that have been changed last time and unfamiliar setting items may be read aloud at a relatively low speed, and the unchanged setting values and setting items that have become accustomed may be read aloud at a relatively fast speed such that all the setting contents are read aloud within a predetermined time (for example, 20 seconds).

Parts or all of the units the control unit 20 may be configured with hardware circuits such as a field programmable gate array (FPGA) and an application specific integrated circuit (ASIC).

Further, it is possible to omit or modify a part of the constituent elements of the above exemplary embodiments within the scope not changing the gist of the present invention. Further, steps may be added, deleted, changed, and exchanged in the flow of the above exemplary embodiment within the scope not changing the gist of the present invention. Further, the program used in the above exemplary embodiment may be provided by being recorded on a computer readable recording medium such as a CD-ROM. In addition, the program used in the above exemplary embodiment may be stored in an external server such as a cloud server, and may be used through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a detection unit that detects whether an operation to be performed on the information processing apparatus conforms with a specific operation while displaying a setting screen; and
a controller that performs control so as to:
at a first stage before setting contents are decided,
output first audio information related to setting items satisfying a predetermined standard by audio, among setting items included in the setting contents, in a case where the specific operation is detected by the detection unit;
after outputting the first audio information, determine whether the setting contents have been changed;
and rewrite a setting information table with changed setting information in a case where the setting contents has been changed, and at a second stage after the setting contents are decided, output second audio information related to the setting contents by audio, in a case where the specific operation is detected by the detection unit;

after outputting the second audio information, determine whether the setting contents have been changed;

and rewrite a setting information table with changed setting information in a case where the setting contents has been changed, wherein the first stage is a stage in which a first screen representing the setting contents is displayed on a display screen, and the second stage is a stage in which a second screen different from the first screen is displayed on the display screen.

2. The information processing apparatus according to claim 1, wherein the second screen includes information on an operation necessary for transmitting the setting contents to the outside.

3. The information processing apparatus according to claim 1, wherein one of the first audio information and the second audio information includes a setting item and a setting value, which are related to a setting value that has been changed last time.

4. The information processing apparatus according to claim 1, wherein one of the first audio information and the second audio information includes a first setting item and a setting value related to an unfamiliar operation, wherein when a number of times of a preset operation, which is executed on the first setting item and the setting value related to the unfamiliar operation, exceeds a threshold value, the preset operation is set to the unfamiliar operation.

5. The information processing apparatus according to claim 3, wherein another one of the first audio information and the second audio information includes remaining setting items and setting values other than the setting item and the setting value, which are related to the setting value that has been changed last time.

6. The information processing apparatus according to claim 3, wherein another one of the first audio information and the second audio information includes all of the setting contents.

7. The information processing apparatus according to claim 4, wherein the first setting item and the setting value related to the unfamiliar operation are excluded from targets to be output by audio, in a case of outputting audio a predetermined number of times.

8. The information processing apparatus according to claim 1, wherein the controller performs control so as to display a selection screen for selecting a function on the display screen before displaying the first screen, and in a case where the specific operation is detected by the detection unit after the function is selected, the controller performs control so as to output third audio information related to the selected function by audio.

9. The information processing apparatus according to claim 8, wherein in a case where the third audio information is output a predetermined number of times by audio, the explanation of the function is changed to a simple explanation, or the output by audio is not performed.

10. The information processing apparatus according to claim 4, wherein with respect to the first audio information or the second audio information, the controller performs control so as to output a second setting item and a setting value related to a setting value changed last time, or the first setting item and the setting value related to the unfamiliar operation by audio at a relatively low speed, and output remaining setting items and setting values by audio at a relatively fast speed such that all the setting items and setting values are output within a predetermined time.

* * * * *